United States Patent [19]
Bradley

[11] 3,761,614
[45] Sept. 25, 1973

[54] ELECTRON-OPTICAL IMAGE TUBES AND IMAGE TUBE STREAK CAMERAS

[76] Inventor: Daniel Joseph Bradley, 7 Piney Hills, Belfast, Ireland

[22] Filed: June 24, 1971

[21] Appl. No.: 156,426

[30] Foreign Application Priority Data
June 26, 1970 Great Britain.................. 31,167/70

[52] U.S. Cl................... 178/7.2, 313/65 R, 313/94, 315/10, 250/213 VT;83.3 HP
[51] Int. Cl........................ H01j 31/26, H01j 39/04
[58] Field of Search....................... 178/7.2; 315/10, 315/11; 313/65 R, 94

[56] References Cited
UNITED STATES PATENTS

| | | | |
|---|---|---|---|
| 3,151,268 | 9/1964 | Clark et al. ............................ | 315/10 |
| 2,727,183 | 12/1955 | Marshall ............................... | 315/11 |
| 3,423,595 | 1/1969 | Hickey ......................... | 250/213 VT |
| 3,555,346 | 1/1971 | McGee et al. ......................... | 315/10 |
| 3,439,222 | 4/1969 | Driard et al. ......................... | 313/94 |

*Primary Examiner*—Robert L. Griffin
*Assistant Examiner*—George G. Stellar
*Attorney*—Young & Thompson

[57] ABSTRACT

An electron-optical image tube is made capable of providing direct measurement of luminous events having durations as short as one picosecond and with a time resolution in the picosecond range by providing a metallic mesh extraction electrode in close proximity to the photo-cathode of the image tube and connecting this extraction electrode to a source of positive potential of variable voltage. An image tube streak camera incorporating such an image tube provides means whereby the photo-electrons in the image tube are deflected by a pulsed electric field of rapid rise time to produce a streaked record. The image tube is particularly suited for use in the analysis of laser beam pulses.

11 Claims, 3 Drawing Figures

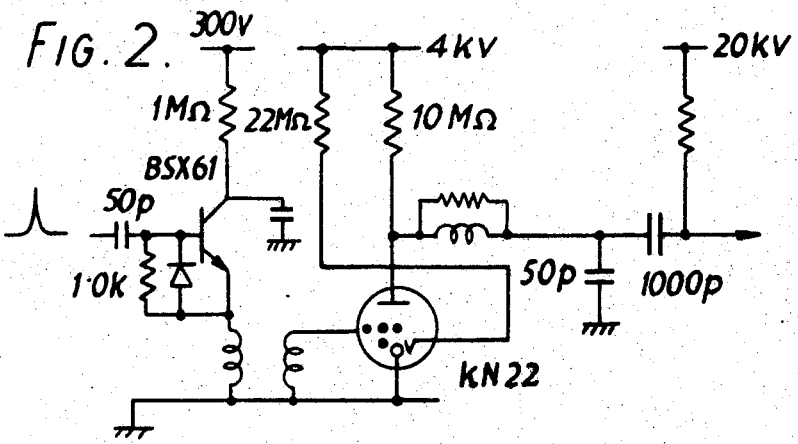
FIG. 2. ALTERNATIVE RAMP GENERATOR
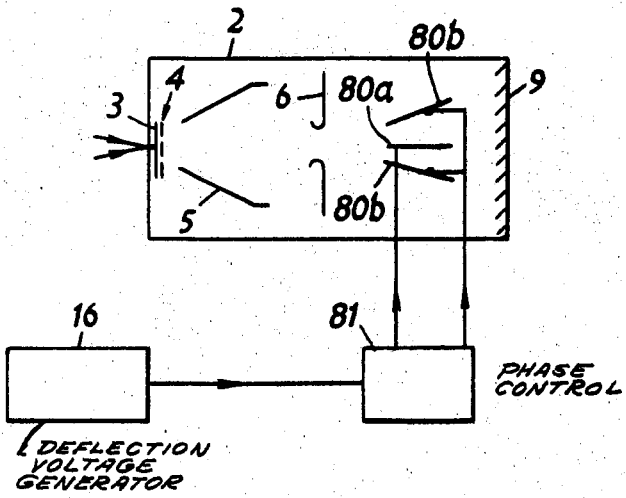
FIG. 3. MODIFIED IMAGE TUBE FOR CONTINUOUS CIRCULAR SCANNING

ELECTRON-OPTICAL IMAGE TUBES AND IMAGE TUBE STREAK CAMERAS

BACKGROUND OF THE INVENTION

1. Field of the Invention

This invention relates to electron-optical image tubes for use in providing direct measurement of luminous events having durations as short as 1 picosecond or less and with a time resolution in the picosecond range.

The invention is particularly concerned with image tube streak cameras operating to such requirements and capable of providing direct linear measurement of ultra-short light pulses, for example from a source such as a laser beam, a plasma discharge, or scattered laser light.

2. Description of the Prior Art

A number of methods of measurement of pulses of picosecond duration are known. One group of such methods uses non-linear optical techniques. For example, second or third harmonics of the pulses may be generated and auto-correlation techniques used to measure the pulse duration; or two-photon and three-photon fluorescence displays may be created which also make use of intensity auto-correlation. However, these non-linear optical techniques have certain disadvantages. The displays which are created do not uniquely define the shape of the pulses. Furthermore, with these non-linear techniques it is not possible to measure pulses of low intensity. Moreover, with laser beams, the presence of a substantial proportion of the laser energy outside the ultra-short pulses themselves is not recorded unless a linear detector such as a fast electron-optical streak camera is used.

As an alternative, direct linear measurement of pulses is known, but with the known methods it has not proved possible accurately to measure ultra-short pulses in the region below about 20 picoseconds. However, pulses can presently be obtained from neodymium, ruby and organic dye lasers with durations of as little as 2 or 3 picoseconds.

SUMMARY OF THE INVENTION

It is an object of the present invention to provide an electron-optical image tube, for use in an image tube streak camera, which is capable of providing direct measurement of shapes and durations of picosecond pulses and which has a time resolution in the picosecond range.

This is achieved in accordance with the invention by an electron-optical image tube comprising a photocathode arranged to convert a slit-form or point-form light image incident thereon to an electron beam, an extraction electrode closely adjacent to the output side of the photocathode and adapted to be connected to a source of positive voltage, and deflection electrode means arranged to receive the accelerated photoelectrons and to subject them to a pulsed electric field to produce a streak record.

Preferably, the extraction electrode is a metallic mesh, for example positioned between about 1 mm and 3 mm from the photocathode.

Thus, a picture image which is small in one or both dimensions is converted to electron beam form at the photocathode, is rapidly accelerated in a strong electric field generated by the extraction electrode placed close to the photocathode so that any spread in the initial photo-electron energy will not limit the time resolution because of differential transit times through the image tube electron-optical system, and is then deflected by a pulsed electric field of rapid rise-time to produce the streaked record. Time is thereby converted into distance so as to permit the direct measurement both of the duration and any rapid variations in the properties of ultra-short luminous sources or events.

The use of the extraction electrode close to the photocathode of the image tube permits control over the time resolution limit of the image tube and the electron-optical image magnification.

The present invention also concerns an image tube streak camera comprising such an image tube in combination with a source of ultra-short light pulses, means providing a slit-form or point-form image of said pulses at the photocathode of the image tube, a source of positive voltage connected to said extraction electrode, voltage generating means connected to said deflection electrode means and providing a ramp voltage thereto which is synchronised with passage of the photoelectrons through the deflection electrode means, and an image intensifier positioned to receive the streak image from the image tube.

The employment of a laser-triggered spark gap as the voltage generating means permits synchronisation of the recording system with the luminous event when this is a laser or is generated by a laser.

To obtain a continuous circular scanning record the image tube may comprise two pairs of electrodes with respective pairs at right-angles to each other, with the pairs of electrodes connected to the voltage generating means in phased relationship to create two mutually perpendicular pulsed electric fields within the image tube.

The deflection sensitivity can be further increased by using a distributed electric field deflection system.

The invention will be more fully understood from the following description of certain preferred embodiments which are given by way of example and with reference to the accompanying drawings.

BRIEF DESCRIPTION OF THE DRAWINGS

FIG. 2 is a circuit diagram of an alternative means for generating the streak deflection voltage; and, FIG. 3 shows a modified form of image tube for providing a continuous scanning record.

DESCRIPTION OF THE PREFERRED EMBODIMENTS

Figure 1:
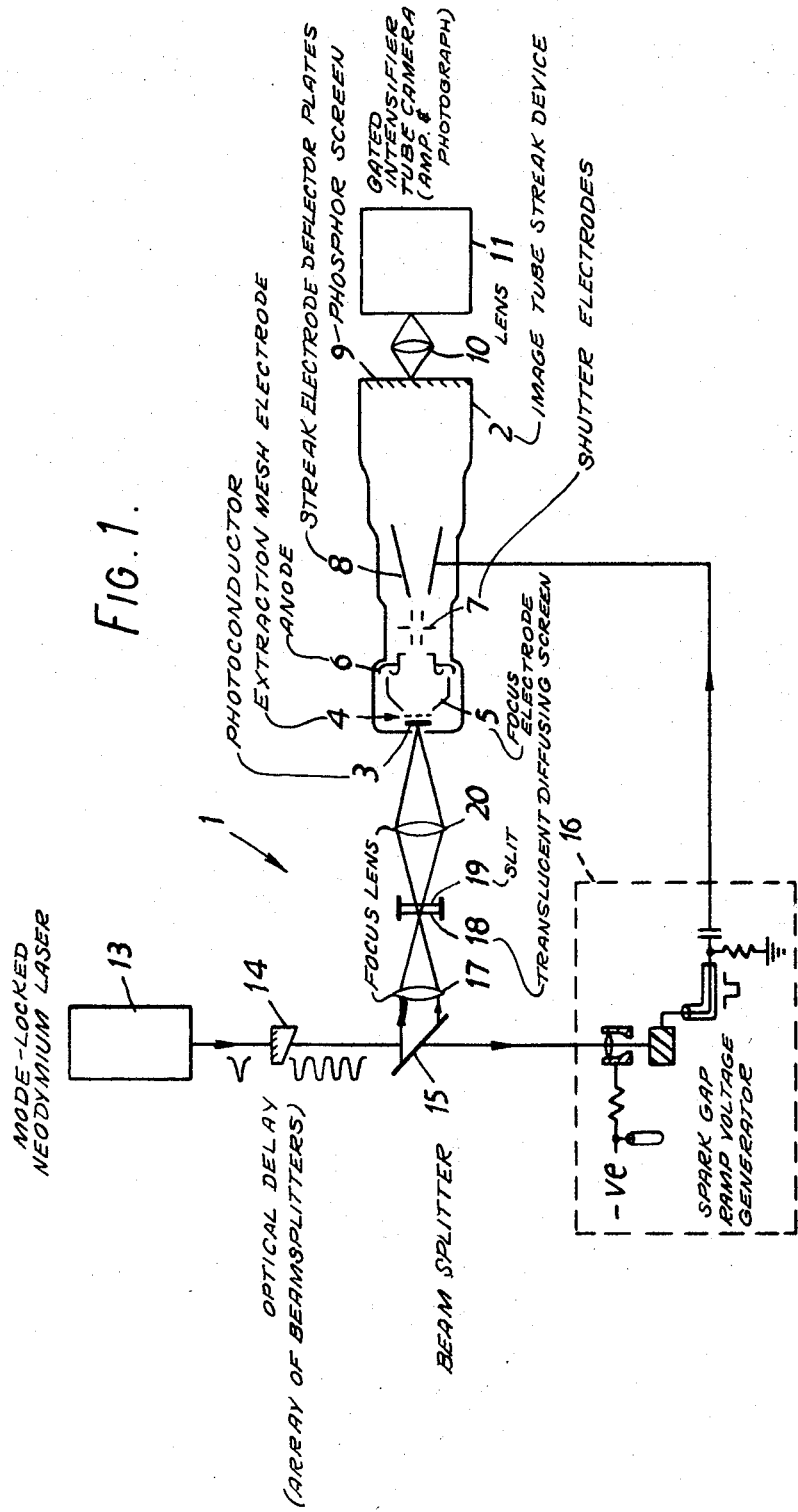
FIG. 1 shows an image tube streak device embodying an image tube in accordance with the invention.

Referring now to the drawings and particularly to FIG. 1 thereof, there is shown an image tube streak device generally indicated at 1. The image tube streak device 1 includes an image tube 2 having a photocathode 3 upon which light pulses of slit or substantially line form are focussed. The photocathode 3 emits electrons in direct response to the incident light, the electrons being emitted from the photocathode 3 with velocities of differing magnitude and direction.

In accordance with the invention an extraction electrode 4 is provided, spaced from and adjacent to the photocathode 3, to generate a strong electric field and accelerate the electrons away from the photocathode 3. The extraction electrode 4 may be for example a fine metallic mesh positioned between about 1 mm and 3 mm from the photocathode 3 of the image tube. An electrode 4 of 300 mesh/cm has been found appropriate for this purpose. Positive electric potentials of up to several kilovolts, for example of the order of 1 kilovolt, are applied to the electrode 4 to rapidly extract the photoelectrons from the photocathode 3, the actual voltage depending upon the type of photocathode used. By this means the spread in electron transit time through the image tube arising from the variation in magnitude and direction of the initial photoelectron velocities can be reduced to about 3 picosecond.

The thus accelerated electrons are then focussed by a conical focussing electrode 5 to pass through the anode 6 of the image tube 2. Shutter electrodes 7 are also provided in the tube. The electron beam then passes through deflector plates or streak electrodes 8, across which is developed a linear ramp voltage of rapid rise-time as the electrons pass through the plates 8. The production of the ramp voltage will be explained in greater detail hereinafter.

After traversing the deflecting field between the streak electrodes 8 the deflected photoelectrons impinge upon a phosphor screen 9 at the end of the image tube 2, thereby exciting a streaked luminous image, perpendicular to the direction of the beam, on the screen 9. The luminous streak image produced by the electrons on the screen 9 is amplified and photographed by an intensifier tube camera. For this purpose there is provided a coupling lens 10 for focussing the image of the streak on the screen 9 on to a gated intensifier tube camera 11, for example a four-stage cascade image intensifier tube.

This further stage of image intensification avoids image distortion and loss of spatial resolution arising from high photocurrent densities which would be necessary if the phosphor screen 9 was photographed directly.

The light source for the image tube 2 may be a laser beam from a neodymium or dye laser, a plasma discharge, or scattered laser light. In the embodiment shown in FIG. 1, the light source is a pulse train from a mode-locked neodymium laser 13. The second harmonic frequency is preferably used, the second harmonic pulses being generated in a suitable crystal (not shown). The pulses pass through an optical delay device 14, for example an array of beam splitters, to provide resulting sub-pulses with accurately known delays therebetween. These sub-pulses are incident upon a high-transmission beam splitter 15, for example a glass plate. Each pulse passes through the splitter 15 and is used for triggering a voltage generator 16, and each pulse also is reflected and directed through a focussing lens 17 to a translucent diffusing screen 18 and slit 19. The screen 18 is mounted just in front of the slit 19, and the latter may have a width for example of 50 μm. A further lens 20 focusses the slit-form image on to the photocathode 3 of the image tube 2.

The splitting of each single pulse by an optical delay device 14 may be particularly useful in calibrating the camera since the time delay between the produced sub-pulses can be accurately calculated.

In order to produce a linear ramp voltage on the deflector plates 8 which rises rapidly as the photoelectrons pass through the plates 8 and to ensure that the voltage is synchronized with the passage of the electrons, there is provided the voltage generator indicated generally at 16. The rise time of the ramp voltage is suitably of the order of 1 nanosecond or less.

The voltage generator 16 preferably comprises a spark gap triggered in known manner by the pulses from the laser beam, as shown in FIG. 1. The output voltage pulses are supplied to the streak electrodes 8 as shown.

The voltage generator 16 may include alternatively an electronic timer acting to switch into circuit, when required, a linear ramp voltage produced by any suitable means.

An alternative form of voltage generator 16 is illustrated in FIG. 2. In this circuit the incoming pulses from the beam splitter 15 are fed to a transistor BSX 61 having a diode connected between the transistor emitter and base. The transistor operates in avalanche mode and the output signals at the emitter thereof are inductively coupled to a krytron tube KN 22 which is a four-element cold-cathode gas discharge switching tube. The output pulses from the circuit to the deflector electrodes 8 are obtained by short-circuiting a 50p capacitance through a small inductance in order to linearise the discharge of the kryton tube. The diode connected across the transistor BSX 61 is a clipping diode which prevents a reverse pulse being fired back into the transistor from the grid of the kryton tube when the latter discharges.

An alternative form of image tube, suitable for use in providing a continuous circular scanning record, is shown in FIG. 3, the same reference numerals being used in FIGS. 1 and 3 to indicate the same or equivalent parts in the two tubes. As shown in FIG. 3, the tube has a modified anode structure and the shutter electrode is omitted. There are provided two pairs of deflector electrodes 80a and 80b mounted to create two deflecting electric fields at right-angles to each other, only one of the two electrodes 80a being visible in the drawing. A phase control device 81 is connected to the pairs of deflector electrodes 80a and 80b so that by controlling the phase of the voltage applied to the electrodes it is possible to produce a continuous circular or spiral deflection path on the phosphor screen 9. Each electrode 80a, 80b is preferably in the form of a strip line to provide a fast electronic response time and means are provided for matching electronic termination on both sides. Strip line electrodes may also be employed with the single pair of streak electrodes 8 of FIG. 1. With this form of image tube a point source is preferably employed at the photocathode instead of a slit image. When employed as a chronometer it is then possible to achieve sub-picosecond time resolution with either circular or linear streaks.

In the continuous working mode of operation of the image tube, employing a circular or spiral deflection path on the phosphor screen, continuously operating laser or other light sources can be recorded and any variation with time thereby revealed. Such applications could include the monitoring and detection of light pulses employed for range-finding, atmospheric probing, optical communications, reading and writing systems. A particular example is in the monitoring and detection of mode-locked laser beams employed in optoelectronic pattern reading machines and for facsimile reproduction apparatus.

I claim:

1. A streaking image tube comprising a photocathode for receiving light images of picosecond duration and converting them to photoelectrons, an extraction electrode consisting of a mesh immediately adjacent to the emission side of the photocathode, a source of positive voltage connected to said mesh to maintain the mesh at a constant positive potential with respect to the photocathode to accelerate the photoelectrons away from the photocathode, a screen for receiving the photoelectrons, and deflection electrode means on the path of the photoelectrons between the mesh and the screen for periodically deflecting said photoelectrons normally to their direction of movement after acceleration thereof, the magnitude of the voltage difference between the photocathode and the mesh and the separation of the photocathode and the mesh being such that the photoelectrons are positively accelerated away from the photocathode at such values that a time resolution in the picosecond range is obtainable in the streak image produced at the screen.

2. An image tube as claimed in claim 1, in which the extraction electrode is spaced between about 1 mm. and 3 mm. from the photocathode.

3. An image tube as claimed in claim 1, in which the source of positive voltage is of the order of 1 kV.

4. An image tube as claimed in claim 1, in which the deflection electrode means comprise at least one pair of strip line electrodes.

5. An image tube as claimed in claim 4, in which the deflection electrode means comprises two pairs of strip line electrodes mounted to provide two deflecting electric fields at right-angles to each other.

6. An image tube streak camera comprising an image tube as claimed in claim 1, a source of ultra-short light pulses, means providing an image of said pulses at the photocathode of the image tube, voltage generating means connected to said deflection electrode means and providing a ramp voltage thereto, means synchronising said ramp voltage with passage of the photoelectrons through the deflection electrode means, and an image intensifier positioned to receive the stream image from the image tube.

7. A camera as claimed in claim 6, wherein the voltage generating means comprises a spark gap triggered by the pulses from the light source.

8. A camera as claimed in claim 6, wherein the voltage generating means comprises a circuit including a gas discharge tube triggered by pulses from a transistor operative in avalanche mode and receiving pulses from the light source.

9. A camera as claimed in claim 6, wherein the ramp voltage has a rise time of the order of one nanosecond.

10. A camera as claimed in claim 6, in which the image tube deflection electrode means comprises two pairs of electrodes with respective pairs at right-angles to each other, and in which said pairs of electrodes are connected to the voltage generating means in phased relationship to create two mutually perpendicular pulsed electric fields within the image tube thereby to provide a continuous streak record.

11. A camera as claimed in claim 6, wherein the light source is a laser.

* * * * *